W. D. HARRIS.
TIRE.
APPLICATION FILED NOV. 15, 1909.
1,163,338.
Patented Dec. 7, 1915.
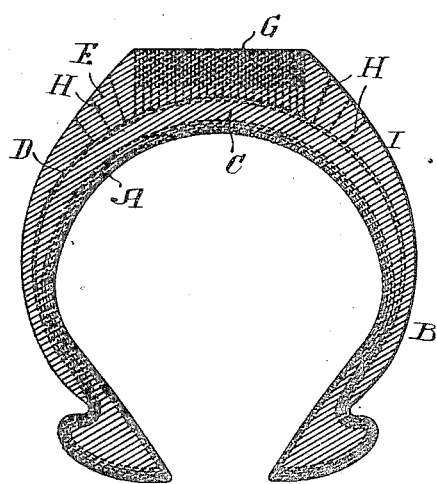
Witnesses.
Augustin B. Copper
Willo A. Burrowes
Inventor,
William D. Harris.
by his Attorneys.
Howson & Howson

UNITED STATES PATENT OFFICE.

WILLIAM D. HARRIS. OF PHILADELPHIA, PENNSYLVANIA, ASSIGNOR TO HARRIS TIRE & RUBBER CO., OF PHILADELPHIA, PENNSYLVANIA, A CORPORATION OF MAINE.

TIRE.

1,163,338.

Specification of Letters Patent.

Patented Dec. 7, 1915.

Original application filed October 2, 1907, Serial No. 395,510. Divided and this application filed November 15, 1909. Serial No. 528,187.

*To all whom it may concern:*

Be it known that I, WILLIAM D. HARRIS, a citizen of the United States, residing at Philadelphia, Pennsylvania, have invented certain Improvements in Tires, (being a division of application for patent filed October 2, 1907, under Serial No. 395,510,) of which the following is a specification.

One object of my invention is to provide a tire particularly designed for use on motor vehicles and belonging to what is known as the vertical tread type, which shall be of such construction that the body of annular strips forming its tread portion shall be prevented from becoming loosened or detached from the body portion thereof under conditions of use; the sheets or strips of fabric whose edges constitute the wearing surface of the tire being so fastened that they shall be permanently held in their relative positions in spite of the stretching and distortion to which the tire may be subjected. These objects and other advantageous ends I secure as hereinafter set forth, reference being had to the accompanying drawings, in which the figure is a vertical section of a tire constructed according to my invention.

In the above drawing, B represents an automobile tire or shoe of U-shaped cross section and gradually increased thickness from the sides to the tread, which consists of a body I of rubber or its equivalent, within which is a lining forming a case or carcass A composed of a number of layers of fabric, such as canvas or cotton duck, placed one over the other and arranged at their edges to form clencher projections.

The wearing surface of the tire is composed of a body G of fabric strips placed substantially parallel with each other, perpendicular to the tread or wearing surface of the tire, and preferably composed of cotton duck or canvas, although fabric of linen or wool may be used; the strips being in any case held together in a solid mass by what is known as friction rubber, and have their warp and weft threads cut on the bias. Between the bottom of this body of strips and the inner lining or carcass A, the body I of rubber is divided into two parts C and E by one or more layers of fabric D constituting a breaker strip which extends around the tire and laterally through the body of the same for any desired distance, so as to be held by the clencher from possible tearing away from the remainder of the tire.

As shown in the drawing, the body G of fabric strips is placed in a wide annular groove extending circumferentially of the tread portion of the tire, and having a depth almost equal to the full thickness of the cover formed by the mass E of rubber in which it is formed. Said cover;—as is obvious from the drawing, is of gradually increasing thickness as the tread portion is approached from each side. In the case illustrated, every other one of the vertical strips forming the body G is extended inwardly and stitched to the fabric layers D, and in addition I have embedded at intervals in the side portions of the tire, strips of fabric H extending circumferentially around the same and also preferably stitched or otherwise held to the fabric D. The body of rubber I between the case or carcass A and the wearing or tread surface formed by the body of strips G serves to prevent the deadening action which would result if said body extended through the tire.

I claim:—

1. As an article of manufacture an automobile tire casing consisting of an annular shoe made U-shaped in cross section and having gradually increased thickness from the sides to the tread and comprising a fabric case or carcass A, and padding layer C of yielding rubber, a breaker strip D of fabric upon the padding layer, a cover E extending over the padding layer and breaker strip and of gradually increasing thickness as the tread portion is approached from each side and the side portions of the cover separated at their thickest portion to form a wide and very deep annular groove almost the full thickness of the cover, combined with a tread portion secured in said annular groove and composed of layers of woven textile material embedded in rubber and having small elasticity and in which the ends of the fibers of the textile layers are brought to the surface of the tread to receive the wear.

2. An automobile tire casing consisting of a shoe formed of a body of rubber; an inner lining; a mass of fabric strips constituting a tread set in said body of rubber with their edges perpendicular to the wearing surface of the tire; a breaker strip extending between said tread and the inner lining; and strips of fabric independent of said tread, set in side portions of the tire substantially perpendicular to the outer surface thereof.

3. An automobile tire casing consisting of a shoe formed of a body of rubber; an inner lining; a mass of fabric strips constituting a tread set in said body of rubber with their edges perpendicular to the wearing surface of the tire; a breaker strip extending between said tread and the inner lining; and strips of fabric independent of said tread set in the side portion of the tire substantially perpendicular to the outer surface thereof; with means for positively connecting said latter strips and the strips of said tread to the breaker strip.

4. An automobile tire casing consisting of a shoe formed of a body of rubber; an inner lining; a mass of fabric strips constituting a tread set in said body of rubber with their edges perpendicular to the wearing surface of the tire; and a breaker strip extending between said tread and the inner lining.

In testimony whereof, I have signed my name to this specification, in the presence of two subscribing witnesses.

WILLIAM D. HARRIS.

Witnesses:
 WILLIAM E. BRADLEY,
 WM. A. BARR.

Copies of this patent may be obtained for five cents each, by addressing the "Commissioner of Patents, Washington, D. C."